United States Patent
Nixon

(10) Patent No.: US 11,414,259 B2
(45) Date of Patent: Aug. 16, 2022

(54) BEVERAGE INSULATING DEVICE

(71) Applicant: Stephen M. Nixon, Greer, SC (US)

(72) Inventor: Stephen M. Nixon, Greer, SC (US)

(*) Notice: Subject to any disclaimer, the term of this patent is extended or adjusted under 35 U.S.C. 154(b) by 359 days.

(21) Appl. No.: 16/853,897

(22) Filed: Apr. 21, 2020

(65) Prior Publication Data

US 2020/0339337 A1  Oct. 29, 2020

Related U.S. Application Data

(60) Provisional application No. 62/837,825, filed on Apr. 24, 2019.

(51) Int. Cl.
  *B65D 81/38* (2006.01)
  *A47J 41/00* (2006.01)

(52) U.S. Cl.
  CPC ...... *B65D 81/3883* (2013.01); *A47J 41/0044* (2013.01); *B65D 81/3881* (2013.01)

(58) Field of Classification Search
  CPC ............. B65D 81/3883; B65D 81/3881; A47J 41/0044; F25D 2303/0841; F25D 3/08; F25D 31/007; A47G 19/2288
  See application file for complete search history.

(56) References Cited

U.S. PATENT DOCUMENTS

| | | | | |
|---|---|---|---|---|
| 3,766,975 A | * | 10/1973 | Todd ................... | A47G 19/2288 165/47 |
| 5,040,719 A | * | 8/1991 | Ballway ................. | A47G 23/03 220/504 |
| 5,052,649 A | * | 10/1991 | Hunnicutt .......... | A47G 23/0225 248/311.2 |
| 5,361,604 A | * | 11/1994 | Pier ....................... | F25D 31/007 62/530 |
| 6,094,935 A | * | 8/2000 | Stein ................... | A47G 19/2288 62/530 |
| 6,330,808 B1 | * | 12/2001 | Kouwenberg ........ | F25D 31/007 62/530 |
| 7,614,516 B2 | * | 11/2009 | Beggins ............. | B65D 81/3881 215/393 |
| 9,181,015 B2 | * | 11/2015 | Booska .............. | B65D 81/3869 |
| 9,555,949 B1 | * | 1/2017 | French ............... | B65D 81/3872 |
| 10,030,903 B2 | * | 7/2018 | Nguyen ..................... | F25D 3/08 |
| 10,173,827 B1 | * | 1/2019 | Foote, Jr. ............ | A47G 23/0241 |
| 10,279,721 B1 | * | 5/2019 | Nelson .................... | B60N 3/103 |
| 2002/0113072 A1 | * | 8/2002 | Lane .................. | B65D 81/3879 220/739 |
| 2005/0224504 A1 | * | 10/2005 | Killoren ............. | B65D 81/3886 220/737 |
| 2008/0314909 A1 | * | 12/2008 | Takeo ................. | B65D 81/3869 220/592.2 |
| 2019/0093945 A1 | * | 3/2019 | Nguyen ................ | F25D 31/007 |

* cited by examiner

*Primary Examiner* — Emmanuel E Duke
(74) *Attorney, Agent, or Firm* — Steve LeBlanc, LLC

(57) ABSTRACT

A beverage insulating device to cool a beverage in a bottle or can includes an outer container, a lid, and an inner container. The inner container may be filled with an insulator or refrigerant material to increase the thermal resistance across the inner container. The size and shape of the inner container may allow the inner container to surround at least a portion of the beverage while also fitting inside the outer container. The lid fits over the bottle or can and securely engages with the outer container to allow the beverage insulating device to simultaneously cool and insulate the beverage while also allowing consumption of the beverage.

20 Claims, 5 Drawing Sheets

BEVERAGE INSULATING DEVICE

RELATED APPLICATIONS

The present application claims priority to previously-filed provisional application filed Apr. 24, 2019, assigned application Ser. No. 62/837,825, and titled "Beverage Insulating Device," which is incorporated by reference in its entirety for all purposes. Any disclaimer that may have occurred during prosecution of the above-referenced application is hereby expressly rescinded.

FIELD OF THE INVENTION

The present invention generally involves a beverage insulating device to keep a beverage cold.

BACKGROUND OF THE INVENTION

Many beverages are sold and distributed in cans or bottles that are chilled prior to consumption of the beverage. Ideally, the beverage remains chilled while being consumed. However, ambient temperatures, the quantity of the beverage, the consumption time, and other human and environmental factors contribute to warming the beverage while being consumed. As a result, some or all of the beverage may be consumed at a higher than ideal temperature.

Many devices and attempts have been made to insulate beverages so that the beverage remains colder for a longer period of time while being consumed. For example, fabric or foam containers may be used to surround or encapsulate the cans or bottles to provide a layer of insulation around the cans or bottles. Another alternative is to transfer the beverage into a tumbler or mug that has better thermal insulation than the cans or bottles, thus providing better insulation between the beverage and ambient temperatures. While these alternatives are relatively inexpensive, portable, and reusable, they each merely provide enhanced insulation without providing any additional cooling for the beverage. Therefore, the need exists for an improved beverage insulating device that can not only insulate the beverage but can also provide additional cooling for the beverage.

BRIEF DESCRIPTION OF THE INVENTION

Aspects and advantages of the invention are set forth below in the following description, or may be obvious from the description, or may be learned through practice of the invention.

Embodiments of the present invention may include a reusable beverage insulating device to cool a beverage in a bottle or can. The device may include an inner container made from a semi-rigid, pressure-expandable plastic material. The inner container may be filled with an insulator or refrigerant material to increase the thermal resistance across the inner container. The size and shape of the inner container may allow the inner container to surround at least a portion of the beverage while also fitting inside an outer container, such as a cup or tumbler. In this manner, the inner container may simultaneously cool and insulate the beverage while also being insulated by the outer container.

In particular embodiments, the inner container may include a filling port to receive a fluid, gel, insulator, or refrigerant. The filling port may be recessed to allow the inner container to fit inside the outer container without interfering with a lid on the outer container. Alternately or in addition, the inner container may include a void that provides a volume in the inner container to allow for expansion of the fluid inside of the inner container as the fluid is frozen.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
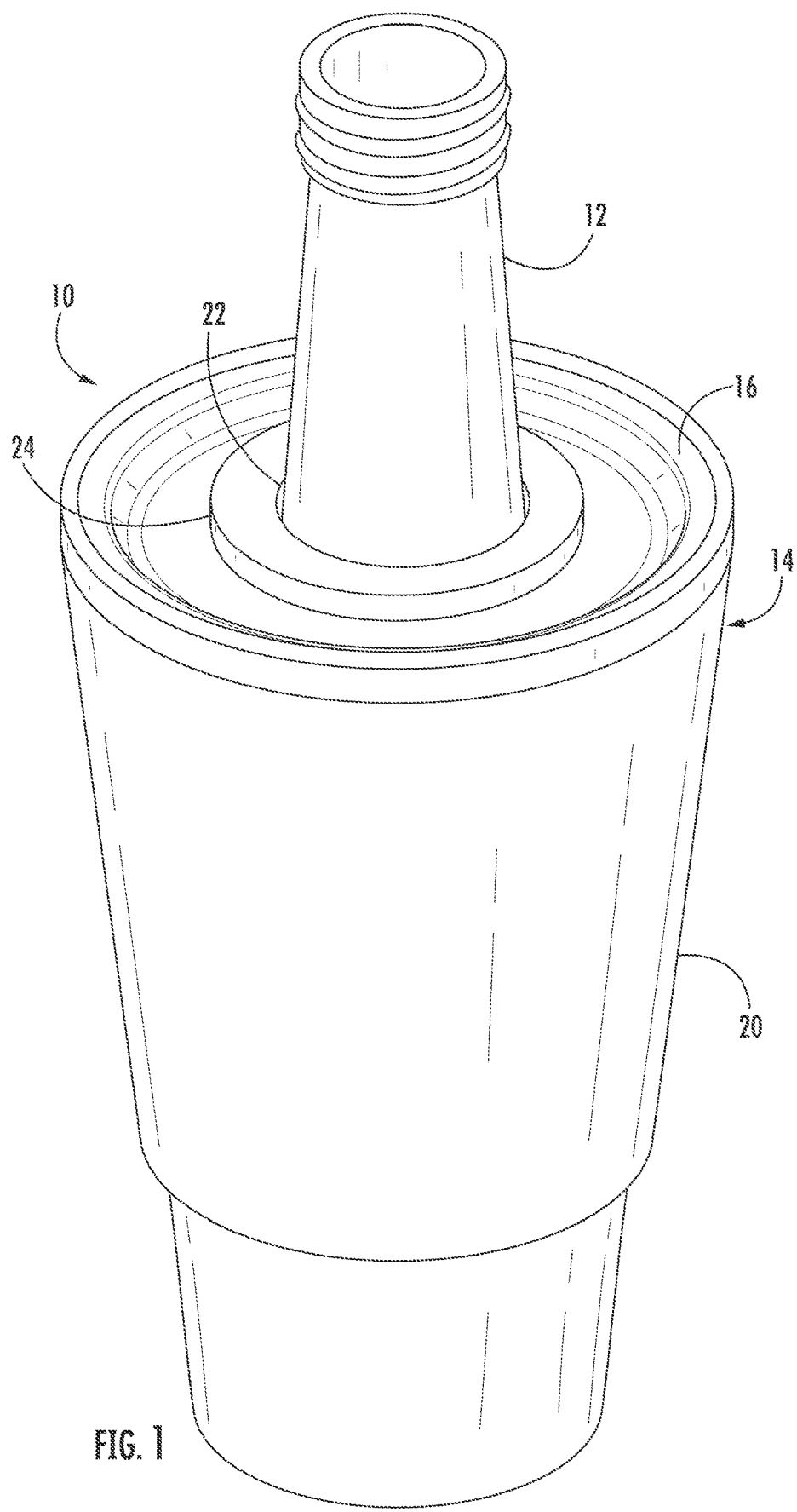
FIG. 1 is a perspective view of a beverage insulating device being used with a bottle according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
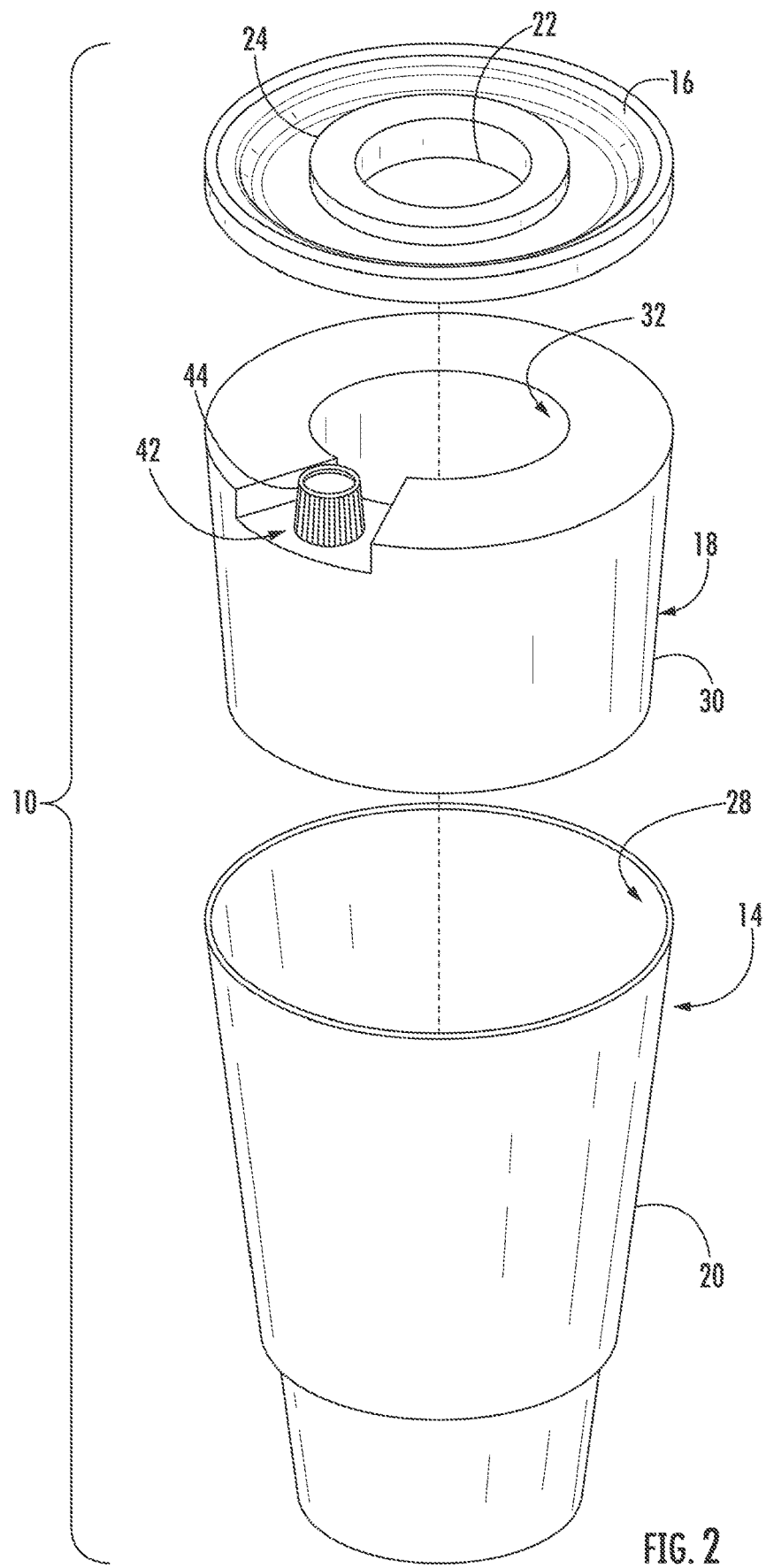
FIG. 2 is an exploded perspective view of the beverage insulating device shown in FIG. 1.

Embodiments of the present invention provide a beverage insulating device 10 that can not only insulate a beverage but can also provide additional cooling for the beverage. FIG. 1 provides a perspective view of the beverage insulating device 10 being used with a bottle 12 containing the beverage according to one embodiment of the present invention, and FIG. 2 provides an exploded perspective view of the beverage insulating device 10 shown in FIG. 1. As shown in FIGS. 1 and 2, the beverage insulating device 10 generally includes an outer container 14, a lid 16, and an inner container 18.

The outer container 14 may be any conventional cup or tumbler for holding a beverage. The outer container 14 may be constructed from any material and may be any shape or size as long as it is large enough to allow the majority of the bottle 12 or can containing the beverage to fit inside the outer container 14. In particular embodiments, the outer container 14 may be a double-walled construction, as with a tumbler, to provide additional insulation to the bottle 12 or can disposed inside the outer container 14. In the particular embodiment shown in FIGS. 1, and 2, the outer container 14 includes an outer surface 20 tapered from top to bottom to reduce the outer circumference of the outer container 14 from top to bottom to facilitate handling the outer container 14.

The lid 16 is sized and shaped to fit over and engage with the top of the outer container 14. The lid 16 includes a cutout or opening 22 to allow a portion of the bottle 12 or can to extend through the lid 16. The cutout or opening 22 may be sized and shaped to accommodate the corresponding size and shape of the top of the bottle 12 or can and may further include a grommet 24 to provide a friction fit between the top of the bottle 12 or can and the lid 16. In this manner, as shown in FIG. 1, the bottle 12 may fit inside the outer container 14 and extend through the lid 16 as the lid 16 simultaneously engages with the top of the outer container 14 and the top of the bottle 12 extending through the lid 15. The simultaneous engagement between the lid 16 and the outer container 14 and the lid 16 and the bottle 12 allows the lid 16 to securely hold the bottle 12 in place to allow consumption of the beverage while the majority of the bottle 12 remains inside the outer container 14. In addition, the lid 16 prevents the free flow of ambient air into the outer container 14 and around the bottle 12. As a result, the volume of air around the bottle 12 inside the outer container 14 provides thermal insulation between the bottle 12 and ambient temperatures.

As shown in FIG. 2, the inner container 18 fits around at least a portion of the bottle 12 or can and fits entirely inside the outer container 14 when the beverage insulating device 10 is fully assembled. The inner container 18 may be constructed from or filled with an insulator or refrigerant 26 that provides additional cooling to the beverage inside the bottle 12 while the bottle 12 is inside the outer container 14.

Figure 3:
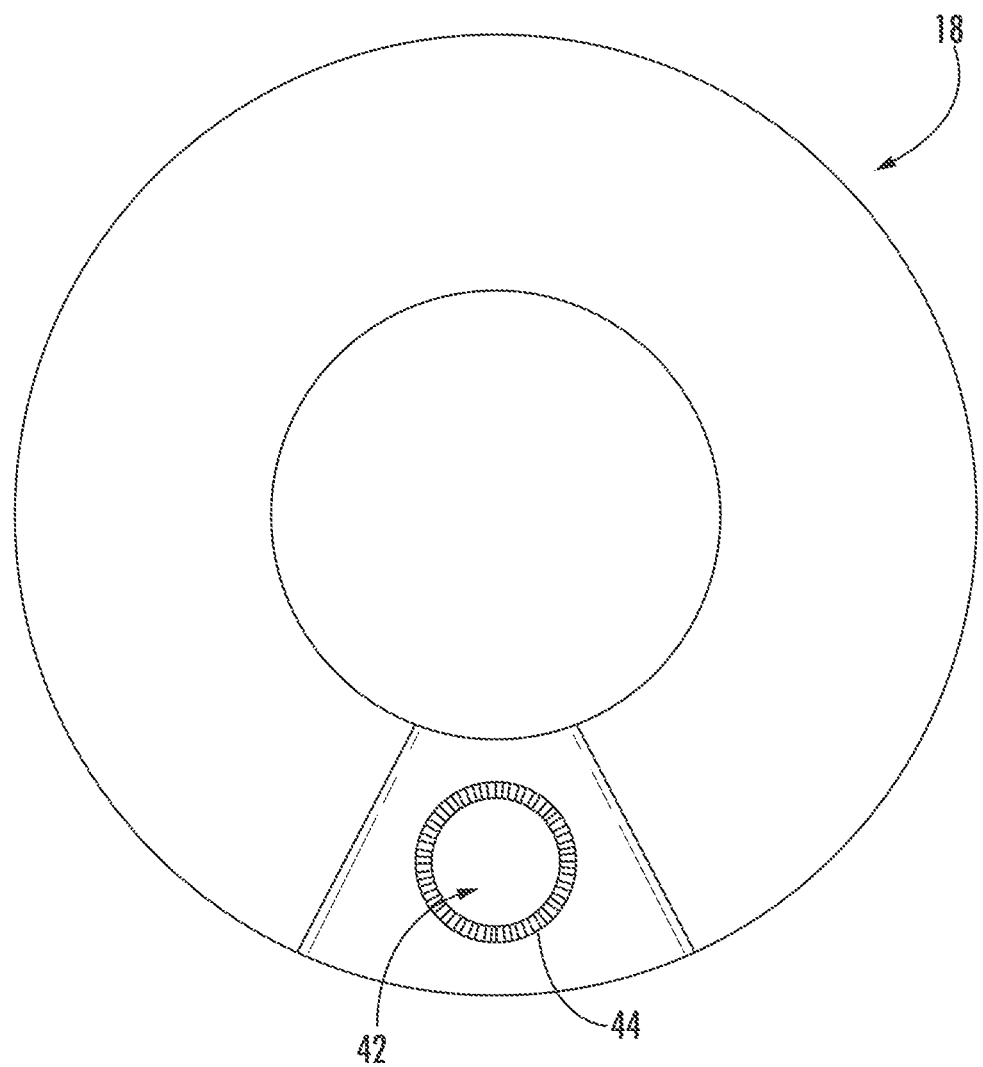
FIG. 3 is a top plan view of the inner container shown in FIG. 2.
Figure 4:
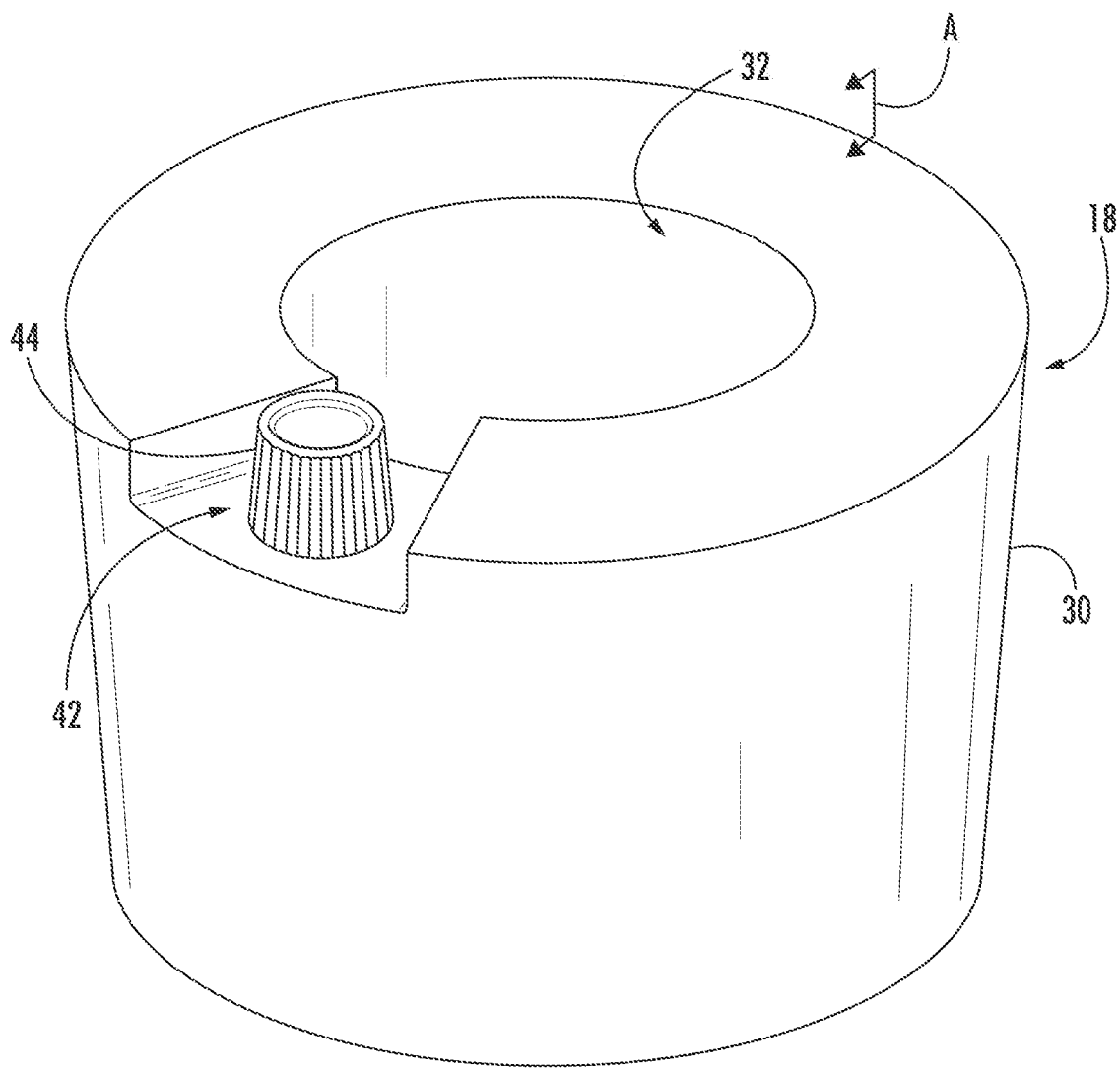
FIG. 4 is a perspective view of the inner container shown in FIGS. 2 and 3.
Figure 5:
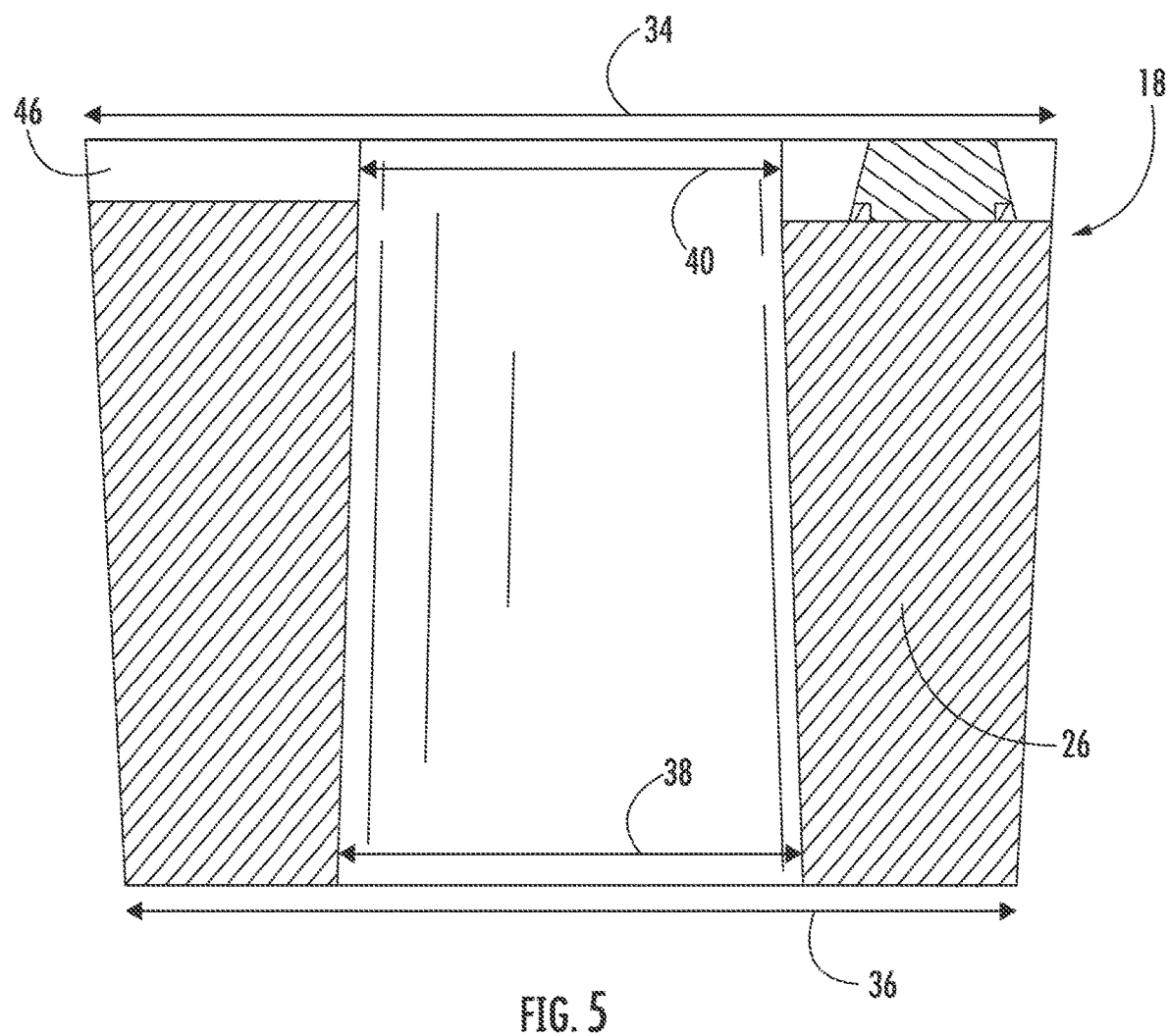
FIG. 5 is side cross-section of the inner container shown in FIG. 4 taken along A-A.

FIGS. 3-5 provide various views of the inner container 18 shown in FIG. 2 according to one embodiment of the present invention. The particular size and dimensions of the inner container 18 may be selected according to the size of the bottle 12 and inner surface 28 of the outer container 14. The inner container 18 may be made by a forming method known as blow-molding and rotational molding techniques. The inner container 18 may include an outer surface 30 tapered to correspond with the tapered inner surface 28 of the outer container 14 to maximize the size and thus potential cooling and insulation capability of the inner container 18. Similarly, the inner container 18 may include an inner surface 32 that corresponds with an outer surface of the bottle 12 to allow the inner container 18 to fit against and be supported by the bottle 12. As shown most clearly in FIGS. 4 and 5, for example, the outer surface 30 of the inner container 18 may be tapered from top to bottom so it has a larger outer circumference or diameter 34 at the top than at the bottom 36 to conform to the inner surface 28 of the outer container 14. Conversely, the inner surface 32 of the inner container 18 may be tapered from bottom to top so it has a larger inner circumference or diameter 38 at the bottom that at the top 40 to conform to the outer surface of the bottle 12.

As shown in FIGS. 2-5, the inner container 18 may include a filling port 42 to receive a fluid, gel, insulator, or refrigerant 26. The filling port 42 may be recessed to allow a cap 44 for the filling port 42 to fit inside the outer container 14 without interfering with the lid 16 on the outer container 14. The recessed filling port 42 may also create a void 46 inside the inner container 18 that prevents the fluid, gel, insulator, or refrigerant 26 from completely filling the inner container 18 to allow for expansion of the fluid inside of the inner container 18 as the fluid is frozen.

Before use, the inner container 18 may be filled with the fluid, gel, insulator, or refrigerant 26 and placed in a freezer to freeze the fluid, gel, insulator, or refrigerant 26 inside the inner container 18. Once frozen, the inner container 18 may be placed over and around the bottle 12 or can to rest on the outer surface of the bottle 12 or can. The bottle 12 or can and inner container 18 may then be placed inside the outer container 14, and the lid 16 may be installed over the top of the bottle 12 or can to securely hold the bottle 12 or can and inner container 18 inside the outer container 14. In this manner, the frozen fluid, gel, insulator, or refrigerant 26 inside the inner container 18 keeps the beverage inside the bottle 12 or can cold; the lid 16 prevents the free flow of ambient air into the outer container 14 and around the bottle 12 to provide thermal insulation between the bottle 12 and ambient temperatures; and the beverage insulating device 12 allows consumption of the beverage while the majority of the bottle 12 remains inside the outer container 14.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A beverage insulating device comprising:
   an outer container, wherein said outer container defines a tapered inner surface;
   an inner container inside said outer container, wherein said inner container defines a tapered outer surface that corresponds with said tapered inner surface of said outer container;
   a cavity defined by said inner container;
   a filling port in said inner container that provides fluid communication into said cavity;
   a lid engaged with said outer container; and
   an opening defined by said lid, wherein said opening is configured to fit around a beverage container so that said lid prevents ambient air from flowing into said outer container.

2. The beverage insulating device as in claim 1, wherein said outer container is double-walled.

3. The beverage insulating device as in claim 1, wherein said inner container defines a tapered inner surface having an upper inner diameter that is smaller than a lower inner diameter.

4. The beverage insulating device as in claim 1, wherein said cavity in said inner container is tapered.

5. The beverage insulating device as in claim 1, further comprising at least one of a fluid, a gel, an insulator, or a refrigerant in said cavity of said inner container.

6. The beverage insulating device as in claim 1, further comprising a cap engaged with said filling port, wherein said cap fits inside said outer container without contacting said lid.

7. The beverage insulating device as in claim 1, wherein said filling port is recessed in said inner container to create a void inside said inner container that prevents fluid from completely filling said inner container.

8. A beverage insulating device comprising:
   an outer container, wherein said outer container defines a tapered inner surface;

an inner container inside said outer container, wherein said inner container defines a cavity;

a filling port in said inner container that provides fluid communication into said cavity;

a lid engaged with said outer container; and an opening defined by said lid, wherein said opening is configured to fit around a beverage container so that said lid prevents ambient air from flowing into said outer container.

9. The beverage insulating device as in claim 8, wherein said outer container is double-walled.

10. The beverage insulating device as in claim 8, wherein said inner container defines a tapered inner surface having an upper inner diameter that is smaller than a lower inner diameter.

11. The beverage insulating device as in claim 8, wherein said cavity in said inner container is tapered.

12. The beverage insulating device as in claim 8, further comprising at least one of a fluid, a gel, an insulator, or a refrigerant in said cavity of said inner container.

13. The beverage insulating device as in claim 8, further comprising a cap engaged with said filling port, wherein said cap fits inside said outer container without contacting said lid.

14. The beverage insulating device as in claim 8, wherein said filling port is recessed in said inner container to create a void inside said inner container that prevents fluid from completely filling said inner container.

15. A beverage insulating device comprising:

an outer container, wherein said outer container defines a tapered inner surface;

an inner container inside said outer container, wherein said inner container defines a tapered outer surface that corresponds with said tapered inner surface of said outer container;

a cavity defined by said inner container;

at least one of a fluid, a gel, an insulator, or a refrigerant in said cavity of said inner container;

a lid engaged with said outer container; and an opening defined by said lid, wherein said opening is configured to fit around a beverage container so that said lid prevents ambient air from flowing into said outer container.

16. The beverage insulating device as in claim 15, wherein said inner container defines a tapered inner surface having an upper inner diameter that is smaller than a lower inner diameter.

17. The beverage insulating device as in claim 15, wherein said cavity in said inner container is tapered.

18. The beverage insulating device as in claim 15, further comprising a void inside said inner container that prevents fluid from completely filling said inner container.

19. The beverage insulating device as in claim 15, further comprising a recessed filling port in said inner container that provides fluid communication into said cavity.

20. The beverage insulating device as in claim 19, further comprising a cap engaged with said recessed filling port, wherein said cap fits inside said outer container without contacting said lid.

* * * * *